United States Patent [19]

Kytola

[11] 4,020,938

[45] May 3, 1977

[54] REMOTE CONTROL APPARATUS FOR VARYING ENGINE SPEEDS AND THE LIKE

[76] Inventor: Aimo J. Kytola, P.O. Box 752, Wilbur, Oreg. 97494

[22] Filed: July 16, 1975

[21] Appl. No.: 596,378

[52] U.S. Cl. .............................. 192/142 R; 74/242; 74/522; 192/143; 251/134

[51] Int. Cl.[2] .................... F16D 71/00; F16K 31/04

[58] Field of Search ............... 192/139, 141, 142 R, 192/143; 123/98; 251/133, 134; 74/242, 482, 522

[56] References Cited

UNITED STATES PATENTS

| | | | |
|---|---|---|---|
| 1,579,324 | 4/1926 | Josephs, Jr. | 251/133 X |
| 2,407,537 | 9/1946 | Chapman | 192/142 R |
| 2,566,859 | 9/1951 | Seeler | 74/482 X |
| 2,662,547 | 12/1953 | Comeau | 251/133 X |
| 2,695,983 | 11/1954 | Price | 192/142 R X |
| 3,955,792 | 5/1976 | Cho | 251/133 |

*Primary Examiner*—Allan D. Herrmann

*Attorney, Agent, or Firm*—Klarquist, Sparkman, Campbell, Leigh, Hall & Whinston

[57] ABSTRACT

A remote control apparatus for varying engine speeds includes a housing and a reversible constant-speed electric motor mounted on the housing, the motor being adapted to drive a pulley at a substantially lower rotational speed through speed reducing gears disposed in the housing. A pair of stops are adjustably mounted on opposite sides of the pulley for stopping the motor upon contact with a pendulum member after a predetermined rotation of the pulley in either direction. A chain attached at one end to the pulley is attachable at its other end to a spring-biased throttle rod of an engine or the like, the chain being wound around the pulley upon rotation of the motor to exert a pull upon the throttle rod and increase the speed of the engine. Rotation of the pulley sufficiently to cause a stop to actuate the pendulum member causes the motor to stop, thereby maintaining the engine speed at a predetermined maximum. Reversing of the motor permits similar controlled deceleration of the engine to a predetermined minimum speed.

4 Claims, 6 Drawing Figures

FIG. 1
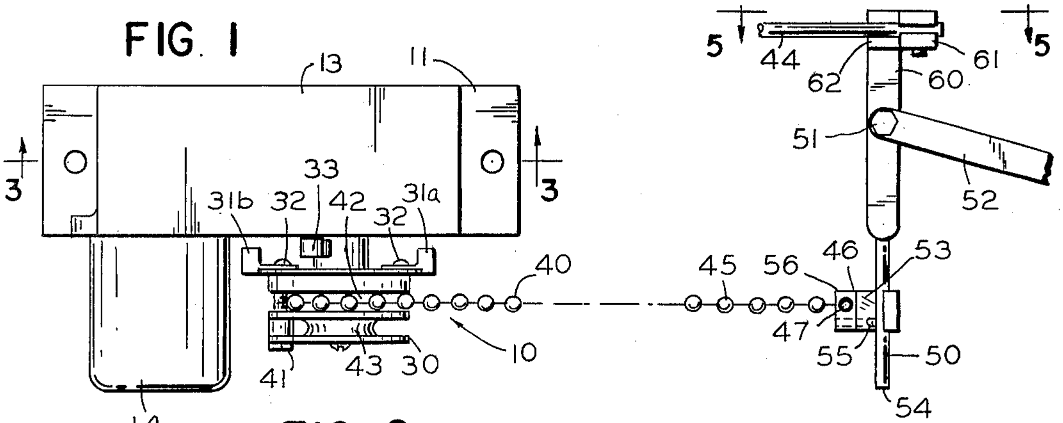
FIG. 2
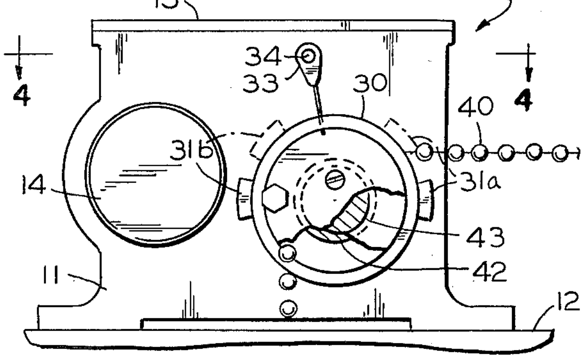
FIG. 5
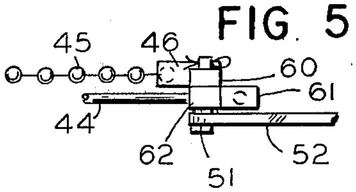
FIG. 3
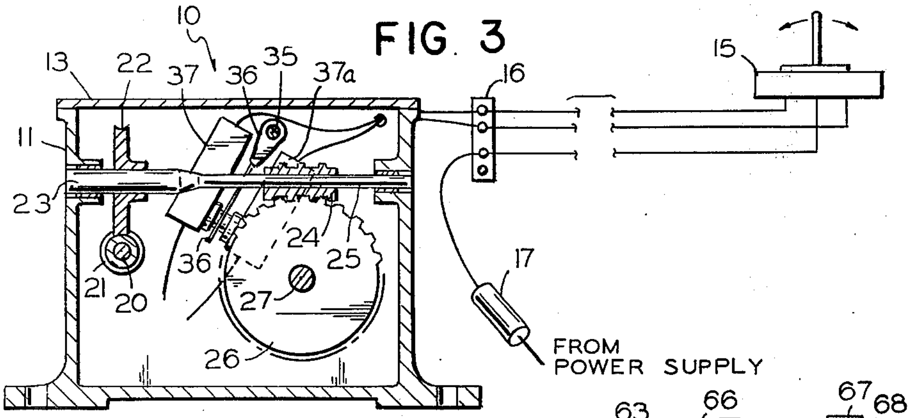
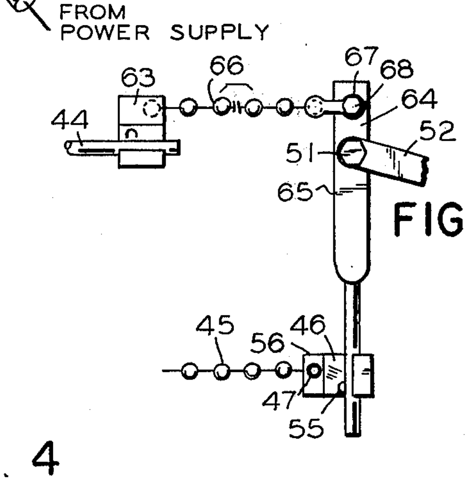
FIG. 6
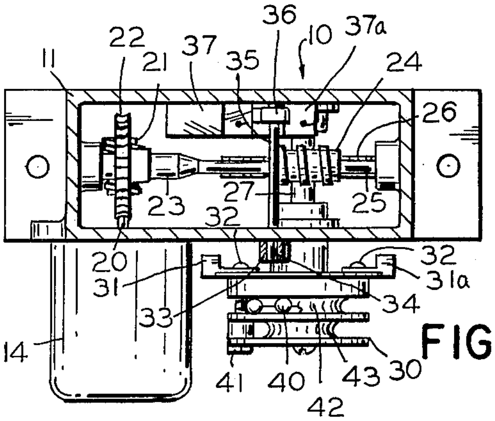
FIG. 4

REMOTE CONTROL APPARATUS FOR VARYING ENGINE SPEEDS AND THE LIKE

BACKGROUND OF THE INVENTION

This invention relates to the regulating of the speed of an engine from a remote position and, more particularly, to an apparatus adapted to effect a regulated and controlled acceleration or deceleration of the speed of an engine to a predetermined maximum or minimum.

Regulating the engine speed of a vehicle or other apparatus without interfering with the functions of such apparatus, has long been a difficult object to achieve especially from a remote location. It is thus a primary object of the present invention to provide a remote control apparatus to enable an operator to vary the speed of an engine from any desired remote location without interfering with the operation of the equipment or machinery concerned.

It is a further object of the present invention to provide apparatus to enable an operator to increase or decrease the speed of an engine from a remote location within the limits of a predetermined maximum and minimum engine speed.

It is a still further object of the present invention to provide apparatus for varying the speed of an engine from a remote location and which will be capable of varying the rate of change of engine speed to a desired degree.

SUMMARY OF THE INVENTION

In accordance with the aforementioned objects the remote control apparatus of the present invention comprises housing means, reversible constant-speed motor means mounted in operative relation to the housing means and including a first shaft driven at a constant rotational speed. Speed reducing means driven by the first shaft include a second shaft rotatable at a substantially lower constant rotational speed than is the first shaft.

Pulley means are mounted on the second shaft such as to be rotatable therewith. Chain means are attached at one end to the pulley means, the other end of the chain means being attachable to, for example, a spring-biased throttle rod of an engine or the like. The chain means are wound around the pulley means upon rotation of the motor means in one direction to pull the throttle rod and increase the speed of the engine. Similarly, the chain means are unwound from the pulley means upon rotation of the motor means in the opposite direction to release the throttle rod and decrease the speed of the engine.

A pair of actuating members or stops are adjustably mounted on opposite sides of the pulley means so that the members can be rotated therewith, each of the members being movable into engagement with a contact means disposed on the housing means and adapted to actuate switch means mounted in communication with the motor means for stopping the same.

Each of the actuating members is movable into engagement with the contact means upon a predetermined rotation of the pulley means in either rotational direction. In this manner rotation of the motor means in one direction to rotate the pulley means and exert a pull on a throttle rod gradually to increase the speed of an engine, causes a first one of the pair of actuating members to engage the contact means and stop the motor means upon reaching a predetermined maximum engine speed. Similarly, rotation of the motor means in the other direction to rotate the pulley means and release the pull on the throttle rod gradually to decrease the speed of the engine, causes a second one of the pair of actuating members to engage the contact means and stop the motor means upon reaching a predetermined minimum speed of the engine.

Desirably, the pulley means comprises a pulley having a pair of grooves of unequal diameters. One end of the chain means can thus selectively be attached to the pulley for winding in either one of the pair of grooves. Winding the chain means around the smaller diameter groove increases the speed of the engine at a slower rate; winding the chain means around the larger diameter groove increases the speed of the engine at a faster rate. Unwinding the chain means from the smaller and larger diameter grooves thus respectively decreases the speed of the engine at rates corresponding to the first named rates.

The apparatus further comprises pivot means positioned remote from the pulley means and lever means pivotally mounted on the pivot means. One end of the chain means is attached to the pulley means as abovementioned, and the other end of the chain means is attached to the lever means adjacent one end thereof.

The lever means further includes clamping means for clamping the other end of the chain means to the lever means at a selected distance from the pivot means. The other end of the lever means is attached to the throttle rod, whereby selected adjustment of the distance at which the other end of the chain means is clamped to the lever means varies the rate of increase and decrease of the engine speed at a desired rate.

If desired, the throttle rod may be attached to the other end of the lever means by a second chain means, thereby to permit the lever means to be mounted at a more remote location from the throttle rod than would otherwise be possible.

BRIEF DESCRIPTION OF THE DRAWINGS

FIG. 1 is a plan view of a preferred embodiment of the invention;

FIG. 2 is a side elevational view with parts broken away;

FIG. 3 is a sectional view taken on line 3—3 of FIG. 1;

FIG. 4 is a sectional view taken on line 4—4 of FIG. 2;

FIG. 5 is a view taken on line 5—5 of FIG. 1; and

FIG. 6 is a plan view of an alternative means of connecting the invention to a throttle rod.

DESCRIPTION OF A PREFERRED EMBODIMENT

Referring to the drawings, the control apparatus 10 of the present invention includes a cast aluminum housing 11 adapted to be bolted to a support 12 and having a removable cast aluminum cover 13. A reversible constant-speed electric motor 14 mounted exteriorly of the housing 11 is controlled by a remote two-position switch 15 through a terminal block 16, as shown. An in-line fuse 17 protects the circuitry and the motor 14 from the power supply.

The motor 14 is designed to rotate a shaft 20 extending interiorly of the housing 11 and to which is affixed a worm gear 21 engageable with a ring gear 22 mounted on a cross shaft 23, as shown. A second worm gear 24 is mounted on the opposite end 25 of the shaft 23 and engages a ring gear 26 mounted on a second cross shaft 27 extending exteriorly of the housing 11 and on which is attached a double-grooved chain pulley 30.

The worm and ring gears shown effect a speed reduction between the motor 14 and the shaft 27 of desirably 1500:1. Energizing the motor 14 thus causes the shaft 27 to rotate at a constant slow speed in either direction, depending on the direction of rotation of the motor 14.

A pair of actuating members or limit stops 31, are adjustably mounted on opposite sides of the pulley 30 so that they can be rotated therewith. The stops 31 are secured to the pulley by adjustable screws 32 so as to make it possible readily to adjust their location on the periphery of the pulley.

A pendulum member 33 is mounted on a cross shaft 34 protruding interiorly into the housing 11 and carrying on its interior end 35 a second pendulum member 36. A pair of limit switches 37, 37*a* mounted in operative relation to the pendulum member 36 are adapted to break the circuits through the motor 14 and stop rotation thereof in either direction of travel upon actution by the pendulum member 36. As can be seen from the drawings, the limit stops 31 are adapted to contact the pendulum member 33 upon a desired degree of rotation of the pulley 30 in either direction, thereby to actuate the pendulum member 36 and, in turn, activate the respective limit switches 37, 37*a* to break the circuits to the motor 14 and stop rotation thereof.

A chain 40 is selectively anchored by a screw 41 to either a smaller diameter groove 43 or a larger diameter groove 42 of the pulley 30. By this means the chain 40 is adapted to be wound around either of the grooves 42, 43 upon rotation of the motor 14 in the appropriate direction, thereby to exert a pull as, for example, upon a spring-biased throttle rod 44 of a remotely positioned engine (not shown). Reversing the direction of rotation of the motor 14 unwinds the chain 40 from the pulley 30, thereby to release the pull on the throttle rod 44.

As can be appreciated, the invention can be used to effect a pulling motion on any spring-loaded or spring-biased device, thereby to open, close or otherwise regulate the device as required. In application to the throttle rod 44 of the remotely positioned engine, the pull effected by the apparatus on the chain 40 is regulatable to achieve infinite speed control throughout a desired range. If the motor 14 is permitted to operate without manual control, winding of the chain 40 about the pulley 30 will continue until a stop 31*a* triggers the pendulum member 33 and thus activates the limit switch 37, thereby to stop the motor 14 and establish the maximum speed of the engine at a predetermined value. Correspondingly, operation of the motor 14 in the opposite direction to release the pull on the chain 40, unwinds the same from the pulley 30 until a stop 31*b* actuates the pendulum member 33, activates the limit switch 37, and thereby stops the motor 14 to set the engine speed at a predetermined minimum value.

Since the pulley 30 is designed with two grooves 42, 43, one of larger diameter and one of smaller diameter, the rate of winding and unwinding of the chain 40 thereabout can be varied to achieve a desired differential rate of engine speed increase or decrease, that is, a desired rate of acceleration or deceleration.

Further to accomplish this objective, the remote end 45 of the chain 40 is attached to an extending leg 56 of an anchor block 46 by a set screw 47. The block 46 is movably clamped to a lever 50 pivotally mounted at 51 on a support 52, as shown. The block 46 is further provided with a slotted portion 53 adapted to fit over the end 54 of the lever 50 such that it can be moved on the lever 50 simply by loosening a set screw 55 and then clamped thereto by tightening the screw at the desired location.

The other end 60 of the lever 50 is attachable to the throttle rod 44 of the engine by a second anchor block 61 mounted thereon and provided with a yoke 62 to permit rotation of the lever as required. Attaching the lever 50 to the throttle rod 44 in this manner achieves sufficient freedom of motion to permit manual override by a foot accelerator or other existing means.

Moving the anchor block 46 inwardly or closer to the pivot point 51, increases the rate of acceleration or deceleration by causing a greater movement of the throttle rod 44 for a given movement of the chain 40. Moving the anchor block 46 outwardly of the pivot point 51 on the lever 50 toward the end 54 thereof, results in a corresponding lesser acceleration or deceleration.

Reversing the respective positions of the pivot point 51 and anchor block 61 effectuates a reverse action upon movement of the chain 40, as may be required in other situations.

In some installations, as for example, around carburetors, air cleaners, fuel injection pumps and the like, and where space is a limiting factor, the throttle rod 44 may be attached to an anchor block 63 which is fastened to the end 64 of a lever 65 by means of a second chain 66 attached by a chain anchor 67 and cap screw 68, as shown in FIG. 6. This arrangement is also desirable where alignment of the throttle rod 44 and the remainder of the apparatus is difficult to achieve. The external linkage of the invention may be arranged in other and varied ways to obtain the required movement for any given application as will be understood by those skilled in the art.

In operating a remotely positioned engine by means of the speed control apparatus of the present invention, operation of the motor 14 by means of the control switch 15 in one direction rotates the shaft 27 at a greatly reduced rotational speed and winds the chain 40 around either desired groove 42, 43 of the pulley 30, thereby to exert a pull on the chain 40 and a corresponding rotation of the level 50 about the pivot point 51. Such results in a pull or extension of the throttle rod 44 and a controlled constant rate of increase in engine speed. If the motor 14 is permitted continuously to operate until the stop 31*a* contacts the pendulum member 33, the limit switch 37 will be activated, thereby to stop the motor 14 and permit the engine to run at the predetermined maximum speed.

Correspondingly, reversing direction of the motor 14 unwinds the chain 40 from the pulley groove to which it is attached, thereby to release the pull on the lever 50 and permit a retraction or release of the throttle rod 44, thereby to result in a steady controlled rate of decrease in engine speed. If the motor 14 is permitted continuously to run until the stop 31*b* contacts the pendulum member 33, again the limit switch 37 will be activated, thereby to set the engine speed at the predetermined minimum.

If the chain 40 is attached to the larger diameter groove 42 of the pulley 30, instead of the smaller diameter groove 43, the rate of pull on the chain 40 will be correspondingly increased, as will the rate of release thereof when the motor 14 is reversed. Such will increase the rate of acceleration or deceleration of the engine over that achieved by attachment of the chain 40 to the smaller diameter groove 43 in an amount proportional to the ratio of the groove diameters.

Moving the chain anchor block 46 inwardly along the lever 50 further increases the rate of acceleration or deceleration of the engine by causing a greater movement of the end 60 of the lever 50 for any given amount of movement of the chain 40. Correspondingly, moving the anchor block 46 toward the other end 54 of the lever 50 results in a lower rate of acceleration or deceleration.

It is apparent that the instant apparatus permits remote control of the speed of an engine to an infinite degree. The engine speed may be varied as described within the limits of a predetermined maximum or minimum rpm. The rate of acceleration or deceleration can also be varied by simple adjustments at either end of the chain.

The apparatus is simple to install and can be used wherever remote control is desired on any internal combustion engine, thereby to achieve infinite speed control at a desired rate of acceleration or deceleration. The apparatus functions not only as a convenient throttle control, but also as a safety device.

Typical applications of the apparatus of the present invention are on all types of log loaders, cranes, shovels, backhoes, forklifts, straddle trucks, fuel trucks, gas and oil tankers, wreckers, utility company boom trucks, fishing boats and personnel or snorkel trucks. Applications are not limited to those in which adequate space is available, but are possible even where space is a decidedly limiting factor. If ready access to the throttle rod of the engine is inhibited, use of the supplemental or second chain 66 permits control as well as facilitating alignment.

I claim:

1. A remote control apparatus for varying engine speeds and the like comprising:

housing means;

reversible motor means mounted in operative relation to said housing means and including a first shaft driven at a constant rotational speed;

speed reducing means driven by said first shaft and including a second shaft rotatable at a substantially lower constant rotational speed than said first shaft;

pulley means mounted on said second shaft and rotatable therewith;

chain means attached at one end thereof to said pulley means, the other end of said chain means being attachable to a spring-biased throttle rod of an engine or the like, said chain means being wound around said pulley means upon rotation of said motor means in one direction to pull said throttle rod and increase the speed of said engine, said chain means being unwound from said pulley means upon rotation of said motor means in the other direction to release said throttle rod and decrease the speed of said engine;

switch means mounted in communication with said motor means for stopping the same;

contact means disposed on said housing means for actuating said switch means; and a pair of actuating members adjustably mounted on opposite sides of said pulley means so that said members can be rotated therewith, each of said members being movable into engagement with said contact means upon a predetermined rotation of said pulley means in either rotational direction, whereby rotation of said motor means in said one direction to rotate said pulley means and increase the speed of said engine causes a first one of said pair of actuating members to engage said contact means and stop said motor means upon reaching a predetermined maximum speed of said engine, and rotation of said motor means in said other direction to rotate said pulley means and decrease the speed of said engine causes a second one of said pair of actuating members to engage said contact means and stop said motor means upon reaching a predetermined minimum speed of said engine.

2. A remote control apparatus as in claim 1 in which said pulley means comprises a pulley having a pair of grooves of unequal diameters, said one end of said chain means being selectively attachable to said pulley for winding in either one of said pair of grooves winding of said chain means around the smaller diameter one of said groove increasing said speed of said engine at one rate, winding of said chain means around the larger one of said grooves increasing said speed of said engine at a faster rate than said one rate, unwinding of said chain means from said smaller and said larger diameter grooves decreasing said speed of said engine at rates corresponding to said first named rates.

3. A remote control apparatus as in claim 1 further comprising pivot means positioned remote from said pulley means;

lever means pivotally mounted on said pivot means, said other end of said chain means being attached to said lever means adjacent one end thereof, said lever means including clamping means for clamping said other end of said chain means to said one end of said lever means at a selected distance from said pivot means, the other end of said lever means being attachable to said throttle rod, whereby selected adjustment of said distance at which said other end of said chain means is clamped to said lever means varies the rate of increase and decrease of said speed of said engine.

4. A remote control apparatus as in claim 3 further comprising second chain means attached at one end thereof to said other end of said lever means, the other end of said second chain means being attachable to said throttle rod for pulling the same on pivoting of said lever means on said pivot means.

* * * * *

UNITED STATES PATENT OFFICE
CERTIFICATE OF CORRECTION

PATENT NO. : 4,020,938
DATED : May 3, 1977
INVENTOR(S) : AIMO J. KYTOLA

It is certified that error appears in the above-identified patent and that said Letters Patent are hereby corrected as shown below:

Column 5, line 15; "described" should be --desired--

Column 6, line 29; after "grooves" insert --","--

Column 6, line 31; "groove" should be --grooves--

Signed and Sealed this

*nineteenth* Day of *July 1977*

[SEAL]

*Attest:*

RUTH C. MASON
*Attesting Officer*

C. MARSHALL DANN
*Commissioner of Patents and Trademarks*